United States Patent [19]

Hassel et al.

[11] 4,411,201

[45] Oct. 25, 1983

[54] RAILWAY CAR DIAPHRAGM CONSTRUCTION

[75] Inventors: Helmut Hassel, Donauwörth; Reimund Stark, Griesbeckerzell, both of Fed. Rep. of Germany

[73] Assignee: Messerschmitt-Boelkow-Blohm Gesellschaft mit beschraenkter Haftung, Munich, Fed. Rep. of Germany

[21] Appl. No.: 271,184

[22] Filed: Jun. 8, 1981

[30] Foreign Application Priority Data

Jun. 30, 1980 [DE] Fed. Rep. of Germany ....... 3024635

[51] Int. Cl.³ .................. B60D 5/00; B61D 17/14; B61D 17/22
[52] U.S. Cl. ................................ 105/8 R; 105/15; 105/18
[58] Field of Search ............... 105/8 A, 8 B, 15, 18, 105/20, 21, 8 R

[56] References Cited

U.S. PATENT DOCUMENTS

| | | | |
|---|---|---|---|
| 2,073,198 | 3/1937 | Dodds, Jr. | 105/8 |
| 2,188,632 | 1/1940 | Ragsdale | 105/8 A |
| 2,264,470 | 12/1941 | Bagatti | 105/8 R |
| 2,337,081 | 12/1943 | Blomberg | 105/15 |
| 2,468,590 | 4/1949 | Dean | 105/8 R |
| 3,399,632 | 9/1968 | Dean | 105/18 X |
| 3,410,226 | 11/1968 | Krupp | 105/18 X |
| 4,252,065 | 2/1981 | Bickel et al. | 105/8 R X |

FOREIGN PATENT DOCUMENTS 595848 4/1960 Canada ................... 105/18

*Primary Examiner*—Bruce H. Stoner, Jr.
*Assistant Examiner*—Howard Beltran
*Attorney, Agent, or Firm*—W. G. Fasse; D. H. Kane, Jr.

[57] ABSTRACT

Bridging structures are arranged between adjacent cars of trains, for example high speed, track guided trains or between the sections of buses having at least two sections. A first type of bridging structure provides a sealed walk-through passage between adjacent cars or bus sections. A second type of bridging structure provides a transition or continuity between adjacent cars or bus sections at the outer housing or shell wall thereof for assuring a streamlined or flush continuity between adjacent cars or bus sections. Both types may be used in combination whereby the first sealing type bridging structure is arranged inside the second type which provides the streamlined or flush continuity at the outer housing or shell wall of a railroad car or bus.

8 Claims, 3 Drawing Figures

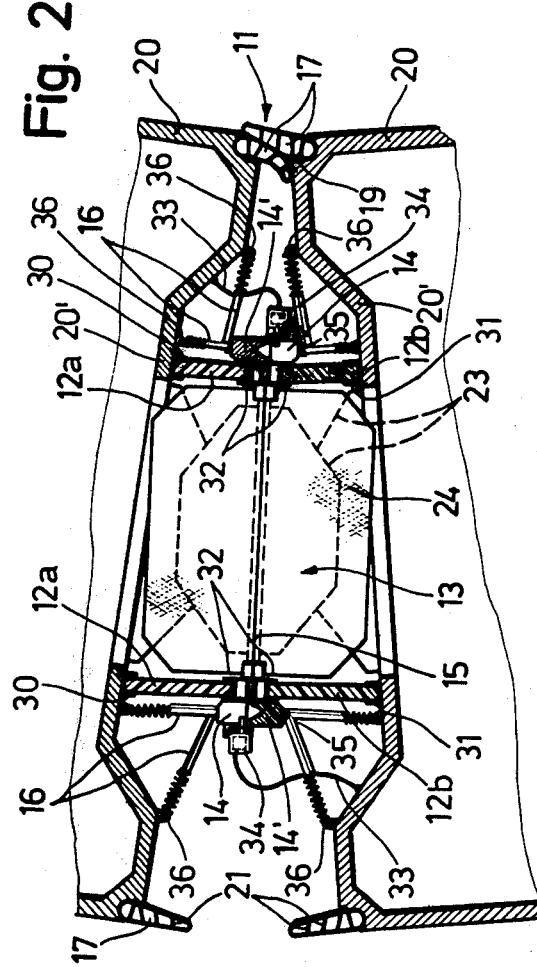
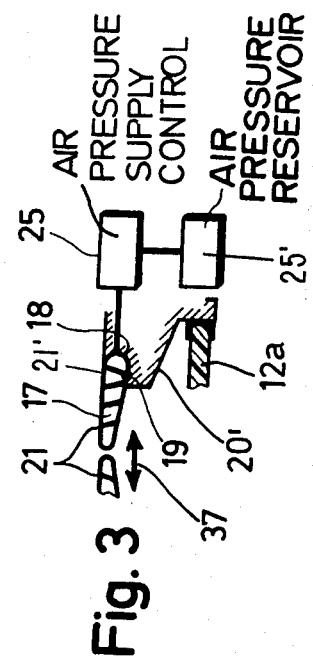

RAILWAY CAR DIAPHRAGM CONSTRUCTION

BACKGROUND OF THE INVENTION

The present invention relates to a bridging structure for use between train cars or between bus sections. Such bridging structures are used, for example, between the cars of high speed, track guided or track bound railroad trains. Such bridging structures are known in the art in a plurality of different versions.

However, prior art bridging structures do not satisfy all the requirements that must be met by such structures especially where high travelling speeds are involved as they are common in connection with present day track guided vehicles. Thus, it is required to provide an extremely effective sealing of the bridging structure between adjacent cars or bus sections. Incidentally, in the following text the term "cars" will be used as an example and the invention is considered to relate to any situation in which the present bridging structure may be useful. An optimally effective sealing in turn requires that there be no gaps between adjacent cars or vehicle units. These seals must assure that a passenger walking from car to car is not exposed to undue noise, air drafts, dirt, and cold. It is also necessary to avoid exposing a passenger to sudden pressure variations or pressure shock. A bridging structure for the present purposes must also cover up the space between adjacent vehicles or vehicle units so as to reduce the aerodynamic resistance of the train or bus on the one hand and simultaneously provide a closed, uninterrupted external appearance of the entire train or bus.

As mentioned, prior art bridging structures do not satisfy all the just stated requirements which are part of a modern travelling comfort. For example, the bridging structures presently employed by the Federal German Railroad are made of rubber beads forming a more or less flexible walk which does not provide a sealed passageway between cars. These structures also do not cover the space or large gap between adjacent cars or vehicles. Further, the just mentioned structures practically do not provide any protection against the nuisance caused by noise nor do they prevent the entry of drafty air, dirt, and cold into the vehicles.

In order to avoid the disadvantages of the so-called rubber bead bridging structures, efforts have been made heretofore to replace these structures by a bellows type structure or by a structure with smooth walls. The bellows type of arrangement resulted in an improvement because this type of structure provides a closed outer contour similar to that of an accordion. However, the coupling of the accordion sections is cumbersome and time consuming. Additionally, this type of structure is subject to a high wear and tear. Accordingly, the accordion type bridging structure has been installed only on very few special trains.

OBJECTS OF THE INVENTION

In view of the above it is the aim of the invention to achieve the following objects singly or in combination:

to eliminate or at least substantially eliminate the disadvantages of the prior art by providing a bridging structure which will assure a complete seal all around a tunnel type passageway between adjacent cars or bus sections;

to provide another type of bridging structure which will optimize the aerodynamic characteristics of the transitions between adjacent cars or bus sections;

to provide a combined bridging structure which will assure simultaneously an effective all around seal of a tunnel type passageway while also assuring an optimal, aerodynamically advantageous closing of the large gap or space between adjacent cars;

to provide a transition bridging structure which is inflatable by the vehicle's own air pressure system; and to separate the solution of the problem of providing a proper seal of the entire passageway between adjacent cars from the problem of providing a good, aerodynamically efficient transition or continuity between adjacent cars or bus sections.

SUMMARY OF THE INVENTION

According to the invention a first bridging structure comprises two flexible circumferentially uninterrupted tunnel sections. Each tunnel section is connected with one of its axially facing end edges to the respective car end while the other axially facing edge is connected to the respective adjacent also axially facing end edge of the neighboring tunnel section. Both connections are accomplished in a sealing manner so that an uninterrupted tunnel passageway is formed by the respective sealing joint securing means all around the car facing end of tunnel sections and all around the facing end of each tunnel section which face each other. Interlocking elements make sure that a continuous, uninterrupted seal is maintained all around between the two tunnel sections.

According to the invention a second bridging structure comprises two flexible cooperating sectional members and connectors for connecting these members to a corner or edge at the end of each car adjacent to the outer shell wall of the car. These aerodynamic bridging sectional members are located in such a position that a substantially streamlined continuity or transition is provided for and between the outer shell walls of adjacent cars or bus sections.

The two types of bridging structures according to the invention may be used in combination, whereby the inner, a seal providing bridging structure, is arranged inside of the outer bridging structure which provides a streamlining transition or continuity between adjacent cars or bus sections.

The first bridging structure which herein may also be referred to as the inner bridging structure is constructed of flexible, noise and heat insulating material forming a pressure tight transition tunnel or passageway, whereby the coupling and interlocking elements may operate automatically, for example, in response to the train's own air pressure system. The automatic coupling and interlocking elements also provide a self-centering function so that the two sections forming the entire tunnel are properly centered relative to each other. Preferably, the inner bridging structure is supported by a set of several spring damping elements. The floor of the all around closed tunnel is preferably formed by hinged or pivoted sheet metal plates 23 which are movable relative to each other and the surface of which is provided with anti-skid means, for example, in the form of a flexible mat having an anti-skid surface.

The second bridging structure which may also be referred to as the outer bridging structure because it is arranged outside around the inner bridging structure, is constructed as an inflatable multi-chamber section which may extend partially or entirely around the outer contour of the car or bus section to provide said streamlined transition or continuity between adjacent cars or bus sections. To secure the multi-chamber hollow sections to the outer edge or corner at the end of a car, tha latter is provided with a groove and the section is provided with a steel core which may be secured to the section or which may be vulcanized or embedded in the section so that the steel core or a portion of the multi-chamber hollow section may be held, for example, by a press fit in said groove. The multi-chamber hollow section is provided with stiffening ribs located in such a way that the section is stiffer in a direction extending across the travel direction than in the travel direction. The travel direction in this context is the direction of the width of the individual section and the direction across the width is the direction of the thickness of the individual element. The steel core may be a steel cable, the ends of which are tightened by a clamping device. One or both ends may be provided with a clamping device. The inflation of the individual chambers of the multi-chamber hollow section may be accomplished automatically by the air-pressure system of the train or vehicle and the pressure within the chambers may be automatically adjusted in several different stages, for example, in response to the speed of a train.

BRIEF FIGURE DESCRIPTION

In order that the invention may be clearly understood, it will now be described, by way of example, with reference to the accompanying drawings, wherein:

FIG. 2 is a sectional view along section line 2—2 in FIG. 1; and

FIG. 3 is a sectional view along section line 3—3 in FIG. 1.

Figure 1:
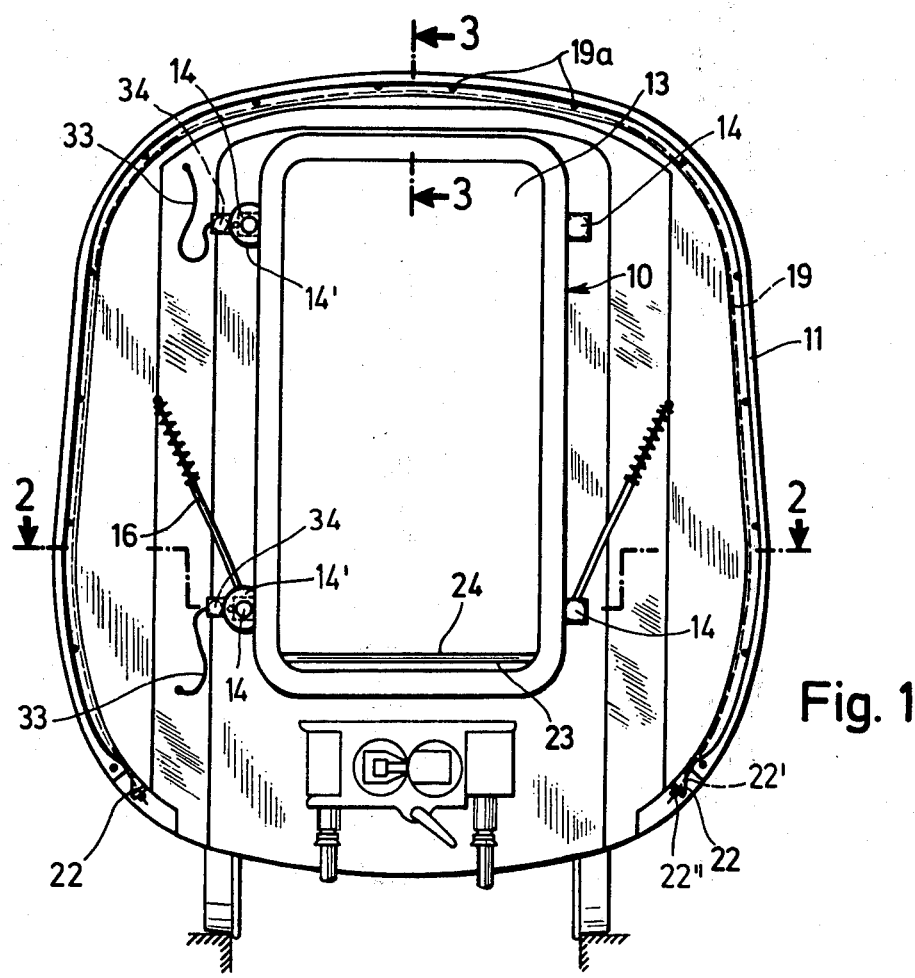
FIG. 1 shows a view facing a front end or a rear end of a railroad car.

DETAILED DESCRIPTION OF PREFERRED EXAMPLE EMBODIMENTS AND OF THE BEST MODE OF THE INVENTION

FIG. 1 shows a first or inner bridging structure 10 and a second or outer bridging structure 11. Although FIG. 1 illustrates both types of bridging structures as used in combination, it will be appreciated, that the structures may be used separately and independently of each other.

Referring to FIGS. 1 and 2 in conjunction, the inner bridging structure 10 forms a tunnel or passageway 13 which is closed all around except at its ends. The tunnel 13 includes a first flexible, uninterrupted tunnel section 12a and a second such section 12b. These sections are made, for example, of a synthetic foam material which is sufficiently expandable and compressible in order to permit the negotiation of a curve by the vehicle as shown in FIG. 2. Thus, the right-hand portions of each tunnel section 12a and 12b are somewhat compressed and the left-hand portions of each tunnel section 12a and 12b are somewhat stretched as the train negotiates a right-hand curve. The opposite applies while negotiating a left-hand curve. Each tunnel section 12a, 12b is secured in a sealing manner to the respective end wall 20' of a car 20. Thus, the tunnel section 12a is secured in a sectional channel member 30 which in turn is attached to the end wall 20'. The tunnel section 12a may be held by an adhesive in the channel section 30 and the latter may be secured to the end wall by screws or the like. Similarly, the tunnel section 12b is held in a channel member 31.

The open ended edges of the tunnel sections 12a, 12b are connected to each other by relatively flexible sealing joint members 32 extending all around the respective edges and held in place by interlocking elements 14, 14' which are constructed for simultaneously are automatically centering these elements relative to each other when the two tunnel sections are brought together at the time of coupling one car to the other. For this purpose the interlocking and automatic alignment elements comprise a pin 14 with a conical tip which rides into a socket 14' with a conical recess to receive the conical tip, whereby an automatic alignment of the two tunnel sections is accomplished. Four such interlocking elements 14, 14' are arranged in pairs, for example, around the tunnel 13 as best seen in FIG. 1 whereby each pair includes a centering pin 14 and a socket 14'.

The centering pin 14 may be operated, for example, by a conventional piston cylinder drive 34 operatively connected through a flexible conduit 33 to the pressure system of a train or bus. Similarly, the flexible joint seal 32 may include an expandable hose connected to the pressure system of the train for improving the seal between the edges of the two tunnel sections. When such a flexible hose is inflated a complete sealing of the tunnel is accomplished not only where the tunnel sections are connected to the car end wall 20', but also where the tunnel sections are connected to each other. With this type of seal in combination with the flexible, noise and heat insulating material of the tunnel sections 12a and 12b, a complete sealing of the space within the tunnel 13 is accomplished.

The just described tunnel sections 12a and 12b are suspended in the space between the two cars by elastic suspension devices 16 which are preferably constructed to include an elastic spring damping element, one end of which is pivoted to the respective rear train wall 20' as shown at 36. The other end of each elastic suspension and damping device 16 is pivoted to the tunnel 13 at pivot points 35. The pivot points 35 are preferably secured to the housing of the centering and locking pin 14 and to the housing of the socket 14'. As seen in FIG. 2, each tunnel section 12a, 12b has at least two elastic suspension devices 16 forming a pair on each side, whereby both suspension devices on each side are arranged at an angle relative to each other.

A walk-way is formed through the tunnel by hinged transition plates 23 which as such as known in the art. These transition plates 23 are movable relative to each other and are centered relative to a common center line 15. The top surface of the plates 23 is provided with anti-skid means 24, for example, in the form of a rubber mat having an anti-skid top surface as is well known.

The second or outer bridging structure 11 according to the invention comprises two flexible, cooperating sectional members 17 which extend partially or completely around the respective outer edge corner of a car 20 at the end wall thereof.

Each of these sections 17 is manufactured as an inflatable multi-chamber hollow section which is inflatable by the air pressure supply device 25 shown in FIG. 3. The size of the air pressure within the individual chambers in combination with the stiffening ribs 21 permits a stiffness adjustment in several stages by varying the pressure with the air pressure supply control device 25 which may be part of the air pressure system of the train. The stiffening ribs 21 are provided with holes 21 so that air under pressure may enter into all the chambers. The hollow sections 17 have a given stiffness in the width direction 37 and a further stiffness in the thickness direction extending perpendicularly to the direction 37 which corresponds to the travel direction of a train. However, the stiffening ribs 21 are slanted somewhat relative to the width direction 37 so that the sections 17 may bend individually as shown in the right-hand side of FIG. 2 when the train travels through a curve. The just described features in combination provide a sufficiently stable outer contour in the transition area to maintain the aerodynamically smooth continuity from car to car when the train travels at high speed. Simultaneously the required flexibility is assured for travelling through curves as shown at the right-hand side of FIG. 2.

As shown in FIG. 3, the two cooperating sections 17 face each other when the train travels along a straight track, whereby the space between two end walls 20' is substantially closed by these sections providing a streamlined outer contour of the transition between two adjacent cars.

The sections 17 are secured to the corners, for example, in grooves 18 having a concave cross-section corresponding to the convex cross-section of the portion of the section 17 which fits into the groove 18. Additionally, the securing is reinforced by a steel core 19, for example, in the form of a steel cable which may be attached to or embedded in the respective section 17, for example, by vulcanization. Further securing elements, for example, in the form of screws or snap fasteners 19a may be provided as shown in FIG. 1. These further securing elements 19a may also be secured to these sections 17, for example, by vulcanization. The steel cores such as a steel cable 19 may be tightened by tightening devices 22 comprising a bracket secured to the car structure. The cable may be provided at one or both ends with a threaded portion 22' extending through a bracket and a tightening nut such as a wing nut 22" secures the respective threaded cable end 22'. Thus, the tensioning in the steel core 19 may be adjusted. This purpose may also be accomplished by a turn-buckle.

The multi-chamber hollow sections 17, for example, made of rubber, have a larger elasticity or yieldability in the travel direction 37 than in the direction extending perpendicularly to the travel direction 37. The pressure in the individual chambers of the sections 17 may be automatically adjusted by adjusting the air pressure supply control 25, for example, in response to the travelling speed of the train. The air pressure supply control 25 include a conventional pressure control valve operatively interposed between a source of pressure 25' and the hollow sections 17. The valve in the pressure supply control 25 is actuated, for example, by a solenoid which in turn is responsive to an electrical signal representing the train speed. The control 25 is connected to the respective inflatable section 17 by well known rapid couplers.

The second or outer bridging structure 11 provides an aerodynamically very satisfactory device for bridging the space between two cars, for example, in a high speed train. Additionally, the outer structure 11 protects the inner tunnel structure, thereby increasing the effectiveness of the latter. This type of structure provides the passenger with an optimum of comfort when passing from one car to another.

Although optimal effects are achieved from the cooperation of the inner and outer bridging structures, these structures are separate and independent of each other and may be used separately and independently of each other.

Although the invention has been described with reference to specific example embodiments, it will be appreciated, that it is intended, to cover all modifications and equivalents within the scope of the appended claims.

What is claimed is:

1. A bridging structure for vehicles, comprising a first flexible tunnel section, first means (30) securing said first tunnel section to its respective vehicle end in a sealing manner, a second flexible tunnel section (12b), second means (31) securing said second tunnel section (12b) to its respective vehicle end in a sealing manner, flexible sealing joint means (32) all around a facing end of each tunnel section for sealing the tunnel sections to each other, interlocking means (14, 14') operatively arranged for locking the first and second tunnel sections (12a, 12b) to each other to maintain a continuous seal all around between the two tunnel sections, said bridging structure further comprising elastic suspension means (16) on each vehicle, first pivot means (35) for pivoting said suspension means (16) to each of said first and second tunnel sections (12a, 12b) and second pivoting means (36) pivoting said suspension means to a respective vehicle section, said elastic suspension means comprising damping means for damping any movements of said first and second tunnel sections (12a, 12b), said elastic suspension means being arranged in pairs so that at least one pair of elastic suspension means is provided on each side of the respective tunnel section, and so that the elastic suspension means forming a pair are arranged at an angle relative to each other.

2. The bridging structure of claim 1, wherein said first and second flexible tunnel sections (12a, 12b) are made of a heat and noise insulating material which forms a substantially leak-proof, pressure tight walk-through passage (13) between adjacent vehicle sections, wherein said interlocking means (14, 14') comprise conical socket means and conical pin means which align the first and second tunnel sections (12a, 12b) relative to each other when the conical pin means drive into the respective conical socket means.

3. The bridging structure of claim 1, further comprising floor means including a plurality of floor panels (23) movable relative to each other and forming a walkway through said bridging structure, and skid-proof means on the upwardly facing surface of said floor panels for avoiding slipping.

4. A bridging structure for vehicles, comprising two flexible cooperating sectional members (17), connecting means (18, 19, 19a) at each vehicle end corner adjacent to an outer shell wall thereof for connecting the respective sectional member to the corresponding vehicle end in such a position that a substantially streamlined continuity is provided for and between two outer shell walls of adjacent vehicles, wherein said flexible cooperating sectional members (17) are constructed as inflatable multichamber hollow sections, said hollow sections extending at least partially around an end edge of a vehicle section, wherein said connecting means comprise a steel core (19) attached to said multichamber hollow sections (17) and groove means (18) around an end corner of a vehicle section into which said steel core of the respective hollow section is clamped with a press fit, wherein said connecting means further comprise tensioning means (22) operatively connecting said steel core (19) to an end of a vehicle section for securing said multichamber hollow section in a tension adjustable manner, and air pressure supply means (25,25') operatively connected to said inflatable multichamber hollow sections (17) for positively controlling the pressure in said hollow sections (17).

5. The bridging structure of claim 4, wherein said multichamber hollow sections (17) comprise reinforcing ribs (21) arranged inside said hollow sections in such positions, that the hollow sections have a given stiffness in the width direction of said hollow sections and a further stiffness larger than said given stiffness in a direction extending substantially perpendicularly to said width direction, said ribs having holes therein for making said hollow sections inflatable.

6. A bridging system for vehicles, comprising a first bridging structure including a first flexible tunnel section (12a), first means (30) securing said first tunnel section to its respective vehicle end in a sealing manner, a second flexible tunnel section (12b), second means (31) securing said second tunnel section (12b) to its respective vehicle end in a sealing manner, flexible sealing joint means (32) all around a facing end of each tunnel section for sealing the tunnel sections to each other, and interlocking means (14, 14') operatively arranged for locking the first and second tunnel sections to each other to maintain a continuous seal all around between the two tunnel sections, whereby the first bridging structure performs primarily a sealing function, and elastic suspension means (16) for suspending said first bridging structure, said elastic suspension means being arranged in pairs so that at least one pair of elastic suspension means is provided on each side of the respective tunnel section, and so that the elastic suspension means forming a pair are arranged at an angle relative to each other, said system further comprising a second bridging structure including two flexible cooperating sectional members (17), connecting means (18, 19, 19a) at each vehicle end corner adjacent to an outer shell wall thereof for connecting the respective sectional member to the corresponding vehicle end in such a position that the second bridging structure provides a substantially streamlined transition for and between two outer shell walls of adjacent vehicles, said sectional members (17) having inflatable chambers, and air pressure supply means (25) operatively connected to said inflatable chambers for positively controlling the air pressure in said chambers, said sectional members of two adjacent vehicles facing each other when the vehicles travel along a straight path, said sectional members of two adjacent vehicles sliding alongside and in parallel to each other on the inner side of a curve substantially in parallel to a longitudinal vehicle axis.

7. The bridging structure of claim 6, wherein said first bridging structure comprises, said first and second flexible tunnel sections (12a, 12b) are made of a heat and noise insulating material which forms a substantially leak-proof, pressure tight walk-through passage (13) between adjacent vehicle sections, wherein said interlocking means (14, 14') comprise conical socket means and pin means which align the first and second tunnel sections (12a, 12b) relative to each other when the conical pin means drive into the respective conical socket means.

8. The bridging structure of claim 6, wherein said first bridging structure further comprises floor means including a plurality of floor panels (23) movable relative to each other and forming a walkway through said bridging structure, and skid-proof means on the upwardly facing surface of said floor panels for avoiding slipping.

* * * * *